United States Patent [19]

Schroeder et al.

[11] 4,272,554

[45] Jun. 9, 1981

[54] PROCESS FOR PREPARING BLISTER-INHIBITED POTATO CHIPS

[75] Inventors: Otto E. Schroeder, Arlington; Alan Wohlman, Richardson; Michael G. Topor, Farmer's Branch, all of Tex.

[73] Assignee: Frito-Lay, Inc., Dallas, Tex.

[21] Appl. No.: 36,367

[22] Filed: May 7, 1979

[51] Int. Cl.$^3$ .............................................. A23L 1/216
[52] U.S. Cl. .................................. 426/321; 426/438; 426/441; 426/637; 426/808
[58] Field of Search ............... 426/321, 637, 438, 441, 426/518, 808

[56] References Cited

U.S. PATENT DOCUMENTS

| 2,531,431 | 11/1950 | Hills | 426/321 X |
| 3,493,390 | 2/1970 | Succo | 426/637 |
| 3,634,095 | 1/1972 | Willard | 426/441 X |
| 3,883,671 | 5/1975 | Shatila | 426/441 X |

FOREIGN PATENT DOCUMENTS 853636 10/1970 Canada ..................................... 426/438

OTHER PUBLICATIONS

Neel et al., "Effect of Precooking Heating on Blistering of Potato Chips", *Potato Chip*, 5-1959, pp. 46, 48 & 52.
Jaswal, "Effects of Various Chemical Blanchings on the Texture of French Fries", *American Potato Journal*, vol. 47, 1970, pp. 13–18.
Reeve et al., "Microscopic Structure of Potato Chips", *American Potato Journal*, vol. 37, 1960, pp. 45–52.
Zoehringer et al., "Observations on the Decrease in Sloughing of Potato Tissue Slices on Soaking in Distilled Water", *American Potato Journal*, vol. 40, 1963, pp. 333–343.
Warren et al, "The Texture of Cooked Potatoes: A Review", *J. Sci. Fd. Agric.*, (vol. 25), 1974, pp. 429–438.
Sterling et al., "Factors Associated with Potato Texture, Physical Attributes & General Conclusions", *Food Research*, vol. 20, 1955, pp. 130–138.
Pyke et al., "The Relation of Calcium Ion to the Sloughing of Potatoes", *American Potato Journal*, vol. 17, 1940, pp. 1–9.
Lineham et al., "Texture of Cooked Potato", *J. Sci Fd. Agric.*, vol. 20, 1969, pp. 113–123.
Bartolome et al., "Firming of Potatoes: Biochemical Effects of Preheating", *J. Agric. Fd. Chem.*, vol. 20, 1972, pp. 266–270.
Joslyn, "The Chemistry of Protopectin: A Critical Review of Historical Data and Recent Developments", *Advances in Food Research* (vol. II), 1962, pp. 1, 83–107.

*Primary Examiner*—Arthur L. Corbin
*Attorney, Agent, or Firm*—Bernard & Brown

[57] ABSTRACT

Potato chips that are inhibited against blister formation during frying are obtained by providing a small, but limited, amount of very dilute calcium, e.g., calcium chloride, in the potato slices prior to frying.

11 Claims, No Drawings

PROCESS FOR PREPARING BLISTER-INHIBITED POTATO CHIPS

The present invention relates to a process for inhibiting the blistering of potato slices during frying by providing a small, but limited, amount of very dilute calcium in the slices prior to frying. The invention also relates to blister-inhibited potato chips having a small amount of calcium added thereto.

In the manufacture of potato chips, undesirable blistering is often obtained during frying of the raw or pretreated potato slices. Blistering is disadvantageous since the product has a relatively non-uniform appearance and is fragile, particularly in the blistered areas, which results in undue breakage of the chips during their packaging and during storage, transporting and handling of the package and consumption of the chips. Also, additional amounts of oil may accumulate in the blistered area to give products having an oily appearance or an unduly high oil-content. There have been prior attempts to avoid such blistering with varying extents of improvement in this respect. For example, an article entitled "Effect of Precooking Heating on Blistering of Potato Chips" by Neel, Potter and Hendel, *Potato Chipper*, pages 46, 48, 52, May, 1959, is concerned with this problem and is a progress report of work conducted with respect to the control of blistering by heating the potato slices in water before they are fried. See also U.S. Pat. No. 3,883,671 to Shatila. The Neel, Potter and Hendel article refers to prior work in which the firmness of potatoes during cooking in water was improved by adding calcium, apparently due to the removal of water-soluble substances and ion exchange.

An article dealing with the structure of potato chips is "Microscopic Structure of Potato Chips", by Reeve and Neel, *American Potato Journal*, 37, pages 45 to 52, 1960. See also, for example, "Observations on the Decrease in Sloughing of Potato Tissue Slices on Soaking in Distilled Water", by Zaehringer, Cunningham and Le Tourneau, *American Potato Journal*, 40, pages 333 to 343, 1963; "The Texture of Cooked Potatoes: A Review", by Warren and Woodman, *J. Sci. Fd. Agric.*, 25, pages 429 to 438, 1974; and *Factors Associated With Potato Texture. III Physical Attributes and General Conclusions*, by Sterling and Bettelheim, *Food Research*, 20, pages 130 to 138, 1955. Another article of possible interest is "Effects of Various Chemical Blanchings on the Texture of French Fries", by Jaswal, *American Potato Journal*, 47, pages 13–18, 1970, which considers the role of added calcium salts in blanching potatoes.

The present invention is directed to a novel manner of inhibiting blister formation during the frying of potato slices by providing in the slices, a small, limited amount of very dilute calcium sufficient to be effective for such inhibition. The fried chips have a relatively uniform and natural appearance, are less fragile than their blistered counterparts, and generally are less oily. Although we do not wish to be bound by theory, it may be that inhibition of blister formation is by the calcium serving to increase intercellular adhesion in the potato slices as they are fried. Several literature articles, for instance, "Texture of Cooked Potato II. Relationships Between Intercellular Adhesion and Chemical Composition of the Tuber", and "III. Intercellular Adhesion of Chemically Treated Tuber Sections", by Lineham and Hughes, *J. Sci. Fd. Agric.* 20, pages 113 to 123, 1969; "Firming of Potatoes: Biochemical Effects of Preheating", by Bartolome and Hoff, *J. Agric. Fd. Chem.*, 20, pages 266 to 270, 1972; "The Chemistry of Protopectin: A Critical Review of Historical Data and Recent Developments", by Joslyn, "Advances in Food Research", II., pages 1, 83 to 107, 1962; and references cited thereby, indicate that a factor in intercellular adhesion in potatoes and other vegetables and fruits is the calcium ion which forms a linkage between pectin molecules. Our studies of blistered potato chips led to the observation of certain physical changes in potato slices that occur during frying and our conclusion that blistering may be the result of a lack of sufficient adhesive forces between the large areas of the cells of the potato slices. We then postulated that the addition of calcium in water-soluble form may serve to strengthen this bond and, thereby, reduce cell separation and blistering of the surfaces of the potato chips during frying.

In accordance with the present invention, calcium may be added to potato slices by contact with a very dilute, aqueous solution of a calcium compound after, for instance, washing or other pretreatment of the slices has occurred. Alternatively, the calcium compound may be added as part of the treating agent in one or more of such pretreating operations. Preferably, the calcium is added more or less immediately before frying. In any event, the added calcium is present in a quite small amount in the slices when they are fried. The calcium can be added as a water-soluble salt, preferably calcium chloride. Other calcium compounds that have sufficient water-solubility and are compatible with food use may be employed and include, for example, calcium sulfamate, calcium acetate and calcium citrate.

The amount of calcium added to the potato slices is sufficient to be effective in inhibiting blistering to a substantial extent during frying. The amount added is generally a minor or small percentage of the weight of the fried potato chips, for example, at least about 100 ppm, e.g., about 200 to 1000 ppm or somewhat more. If too much calcium is added the chips may become brittle or have objectionable taste. The aqueous solution by which the calcium can be added to the chips is quite dilute, for instance, up to about 0.05 molar, often at least about 0.003 or 0.005 molar. The better results have been obtained when the concentration was at least about 0.01 molar. The preferred concentrations are about 0.02 to 0.04 molar, although solutions of somewhat higher concentration may be used. When the solution was 0.05 molar, the brittleness and oiliness of the chips seemed to increase, so the use of solutions of higher concentration is usually avoided.

Contact between the potato slices and the calcium solution may be at various suitable temperatures. Studies of the effects of different temperatures did not show a significant result, so temperatures of about 10° to 40° C., advantageously about 15° to 30° C., are generally employed.

The calcium solution may be contacted with the potato slices in any desired way, for instance, by spraying, dipping or the like, and in the case of dipping, the immersion time may be quite short, for instance, about 1 second or more. The length of the immersion time was varied without any particular effect being observed, except, perhaps, when the calcium concentration in the solution was quite low. If the time is too extended, adverse effects may be encountered and, generally, one would keep the immersion time low as a matter of convenience. The addition of calcium to the potato slices is very easily and conveniently accomplished in present potato chip manufacturing procedures and, thus, the latter do not have to be materially altered to adopt the present invention which is quite flexible and can be readily incorporated into different types of processing systems.

The potato slices used in the present invention have a thickness suitable for making potato chips. For example, essentially uncooked, natural potatoes can be cut into slices by means of any of the various devices that are available for such use. Typically, whole, raw potatoes may be scrubbed prior to slicing and they may be either peeled or left unpeeled. Generally, individual potato slices have a thickness of up to about 0.1 inch, e.g., from about 0.03 to 0.1 inch, usually about 0.04 to 0.07 inch, and these slices are suitable for making into potato chips according to the process of the invention. The potato slices may be washed in water to improve their handling characteristics during further processing according to the invention. Specifically, washing of the potatoes removes surface starch and diminishes the tendency of the slices to stick together or to stick to machinery. It may be desired to blanch the potatoes prior to slicing. Blanching at this and/or another time, e.g., after slicing, can be accomplished by chemical or steam treatment.

The slices containing calcium are fried by any suitable means for frying potato chips such as deep fat frying. Typically, the slices are more or less immersed in a cooking oil, e.g., cottonseed oil, for a period of from about 60 to 160 seconds, preferably about 90 to 130 seconds, at a temperature of from about 150° C. to 200° C., preferably about 160° to 190° C. to fry the slices. The slices are then removed from the fryer, cooled and, if desired, salt or other flavoring agents may be added. The resulting slices are ready for packaging.

The present invention was further illustrated by peeling raw potatoes using an abrasive-type peeler. The peeled potatoes were cut by a centrifugal slicer into slices about 0.055 inch thick. The slices were washed in tap water to remove excess starch. In the standard procedure, the slices were submerged momentarily in a 0.025 M aqueous solution of analytical grade calcium chloride at ambient temperature and then fried in additive-free cottonseed oil at about 355° F. This procedure was, in essence, followed in the various examples below, except when noted otherwise. The resulting fried chips exhibited significantly less blistering than did chips similarly prepared, but without being subjected to dipping in the calcium chloride solution. The chips prepared in accordance with the invention had better uniformity and less greasy surfaces, and were less fragile.

Representative results are reported in Table I.

TABLE I

| Conditions | | | | Results[1] | | |
|---|---|---|---|---|---|---|
| Molarity | Immersion Time, Sec. | Temp. °C. | pH | 0% | 25-50% | >50% |
| CONTROL | | | | 44 | 41 | 15 |
| 0.005 | 1 | 21 | — | 58 | 37 | 5 |
| 0.005 | 40 | 21 | — | 80 | 16 | 4 |
| 0.015 | 20 | 21 | — | 85 | 15 | 0 |
| 0.015 | 120 | 21 | — | 95 | 5 | 0 |
| 0.025 | 1 | 21 | — | 98 | 2 | 0 |
| 0.025 | 40 | 21 | — | 100 | 0 | 0 |
| 0.035 | 20 | 21 | — | 100 | 0 | 0 |
| 0.035 | 60 | 21 | — | 100 | 0 | 0 |
| CONTROL | | | | 53 | 33 | 14 |
| 0.005 | — | 3 | — | 38 | 46 | 16 |
| 0.005 | — | 80 | — | 54 | 34 | 12 |
| 0.015 | — | 10 | — | 49 | 46 | 5 |

TABLE I-continued

| Conditions | | | | Results[1] | | |
|---|---|---|---|---|---|---|
| Molarity | Immersion Time, Sec. | Temp. °C. | pH | 0% | 25-50% | >50% |
| 0.015 | — | 20 | — | 61 | 31 | 8 |
| 0.025 | — | 20 | — | 92 | 8 | 0 |
| 0.025 | — | 40 | — | 89 | 11 | 0 |
| 0.035 | — | 20 | — | 98 | 2 | 0 |
| 0.035 | — | 80 | — | 95 | 5 | 0 |
| CONTROL | | | | 67 | 25 | 8 |
| 0.010 | — | 24 | 6.75 | 82 | 14 | 4 |
| 0.020 | — | 24 | 6.7 | 94 | 6 | 0 |
| 0.030 | — | 24 | 6.8 | 98 | 2 | 0 |
| 0.045 | — | 24 | 6.8 | 100 | 0 | 0 |
| CONTROL | | | | 61 | 34 | 5 |
| 0.005 | — | — | 4[2] | 71 | 26 | 3 |
| 0.015 | — | — | 6 | 71 | 23 | 6 |
| 0.035 | — | — | 7 | 100 | 0 | 0 |
| 0.005 | — | — | 8 | 62 | 36 | 2 |
| 0.025 | — | — | 8 | 93 | 7 | 0 |
| 0.035 | — | — | 10 | 100 | 0 | 0 |

[1]0% = Wt. % of chips having no blisters.
25-50% = Wt. % of chips whose surface is 25% to 50% blistered.
>50% = Wt. % of chips whose surface is greater than 50% blistered.
[2]The pH was adjusted as needed by addition of HCl or NaOH.

In another study, potato chips were fried essentially under the standard conditions, with or without prior immersion in a 0.025 or 0.035 molar calcium chloride solution, and an operation with a given oil bath continued over a period of 2, 4 or 6 hours to determine the calcium content of the chips and the oil at the start and finish of the period, and the effect on the blistering of the chips. The results are reported in Table II.

TABLE II

| Run | Time of Run | Molarity of CaCl$_2$ Soln. | Ca$^{++}$ Content Oil Wt. % | Ca$^{++}$ Content Chips, ppm | Blistering 0% | Blistering 25-50% | Blistering 50% |
|---|---|---|---|---|---|---|---|
| 1 | 30 minutes[2] | None | 0.08 | 284 | — | — | — |
| 1 | 90 minutes | None | 0.21 | 243 | 60 | 32 | 8 |
| 2 | 30 minutes | 0.025 | 0.19 | 595 | — | — | — |
| 2 | 90 minutes | 0.025 | 1.89 | 630 | 87 | 11 | 2 |
| 3 | 5 minutes | None | — | 358.3 | — | — | — |
| 4 | 5 minutes | 0.035 | — | 641.7 | — | — | — |
| 3 | 2 hours | None | — | 426.6 | — | — | — |
| 4 | 2 hours | 0.035 | — | 909.4 | — | — | — |
| 3 | 4 houRs | None | — | 352.7 | — | — | — |
| 4 | 4 hours | 0.035 | — | 1033 | — | — | — |
| 3 | 6 hours | None | — | 416.4 | — | 52.3%[1] | — |
| 4 | 6 hours | 0.035 | — | 959.1 | — | 12.6% | — |

[1]A sample of chips was taken every 2 hours from each run and then all samples of a given run were mixed and evaluated for blistering. The value reported is weight % of the chips whose surface area was over 25% blistered.
[2]In Runs 1 and 2 the samples were taken at the 30th and 90th minutes of the run.

It is claimed:
1. A process for making potato chips which comprises contacting potato slices, having a thickness of up to about 0.1 inch, with an aqueous solution having calcium dissolved therein to add to said slices a small amount of calcium sufficient to inhibit the formation of blisters on the slices upon frying, said aqueous solution having calcium dissolved therein in a concentration of up to about 0.05 molar, said contacting being at a temperature of about 10° to 40° C., and frying the resulting calcium-containing slices to provide said chips.

2. A process of claim 1 wherein said added amount of calcium is about 200 to 1000 parts per million based on the weight of the fried chips.

3. A process of claim 1 or 2 wherein the calcium is added to said slices by contact with an aqueous calcium chloride solution.

4. A process of claim 3 wherein said aqueous solution is about 0.02 to 0.04 molar in calcium.

5. A process for making potato chips which comprises slicing potatoes to provide slices having a thickness of about 0.03 to 0.07 inch, contacting said slices with an aqueous solution having calcium dissolved therein in a concentration of about 0.02 to 0.04 molar to add a small amount of calcium to said slices sufficient to inhibit blistering of the slices upon frying, said contacting being at a temperature of about 10° to 40° C., and frying the calcium-containing slices to provide said chips.

6. A process of claim 5 wherein said added amount of calcium is about 200 to 1000 parts per million based on the weight of the fried chips.

7. A process of claim 5 or 6 wherein the calcium is added to said slices by contact with an aqueous calcium chloride solution.

8. A process for making potato chips which comprises contacting potato slices having a thickness of up to about 0.1 inch, with an aqueous solution having calcium dissolved therein to add to said slices a small amount of calcium sufficient to inhibit the formation of blisters on the slices upon frying, said aqueous solution having calcium dissolved therein in a concentration of up to about 0.05 molar, said contacting being at about 10° to 40° C., and frying the resulting calcium-containing slices to provide said chips, said amount of calcium added being about 100 to 1000 parts per million based on the weight of the fried chips.

9. The process of claim 8 wherein the calcium is added to said slices by contact with an aqueous calcium chloride solution.

10. The process of claim 8 or 9 wherein said contact is by momentarily immersing said potato slices in said solution.

11. The process of claim 10 in which the time of said immersion is about 1 to 120 seconds.

* * * * *